United States Patent
Kim et al.

(10) Patent No.: US 12,365,116 B2
(45) Date of Patent: Jul. 22, 2025

(54) APPARATUS AND METHOD FOR MOLDING POUCH

(71) Applicant: LG Energy Solution, Ltd., Seoul (KR)

(72) Inventors: Shin Chul Kim, Daejeon (KR); Kwang Hee Choi, Daejeon (KR); Chang Min Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 93 days.

(21) Appl. No.: 17/923,801

(22) PCT Filed: Nov. 10, 2021

(86) PCT No.: PCT/KR2021/016331
§ 371 (c)(1),
(2) Date: Nov. 7, 2022

(87) PCT Pub. No.: WO2022/103146
PCT Pub. Date: May 19, 2022

(65) Prior Publication Data
US 2024/0149498 A1    May 9, 2024

(30) Foreign Application Priority Data

Nov. 10, 2020   (KR) .................. 10-2020-0149608
Nov. 2, 2021    (KR) .................. 10-2021-0149016

(51) Int. Cl.
*B29C 33/30*    (2006.01)
*B29C 33/42*    (2006.01)
(Continued)

(52) U.S. Cl.
CPC ............ *B29C 33/301* (2013.01); *B29C 33/42* (2013.01); *B29C 33/38* (2013.01); *B29C 37/005* (2013.01);
(Continued)

(58) Field of Classification Search
CPC ..... B26D 5/30; B26D 7/18; B26F 1/40; B26F 1/44; B29C 53/04; B29C 53/80;
(Continued)

(56) References Cited

U.S. PATENT DOCUMENTS

| 2020/0168853 A1* | 5/2020 | Kim ............... H01M 50/103 |
| 2020/0282627 A1 | 9/2020 | Kim et al. |
| 2021/0086388 A1 | 3/2021 | Lee et al. |

FOREIGN PATENT DOCUMENTS

| CN | 109911326 A | 6/2019 |
| CN | 110382204 A | 10/2019 |

(Continued)

OTHER PUBLICATIONS

NPL Huyett "Introduction to Shims" Shims; Retrieved ffrom https://www.huyett.com/blog/introduction-to-shims#:~:text=While%20shim%20rings%20and%20washers,loads%2C%20while%20shims%20fill%20space. (Year: 2021).*

(Continued)

*Primary Examiner* — Jeffrey M Wollschlager
*Assistant Examiner* — Edgaredmanuel Troche
(74) *Attorney, Agent, or Firm* — Lerner David LLP

(57) ABSTRACT

An apparatus for molding a pouch includes: a die assembly with a die; a stripper assembly to press and fix both sides of a pouch film disposed on the die; and a punch assembly with a punch to mold an electrode assembly accommodation part in the pouch film. The stripper assembly includes: a stripper disposed at a punch assembly lower portion to press and fix the pouch film; a stripper driving piece at a punch assembly upper portion to provide force so that the stripper presses the pouch film; and a connection part to connect the stripper driving piece to the stripper to transmit the force. The connection part includes: two or more connection rods coupled to the stripper; a connection bar coupled to the (Continued)

stripper driving piece; and a connection piece to connect one or more of the connection rods to the connection bar to transmit the force.

13 Claims, 11 Drawing Sheets

(51) Int. Cl.
*B29C 37/00* (2006.01)
*B29C 43/36* (2006.01)
*B29L 31/00* (2006.01)
*B29C 33/38* (2006.01)

(52) U.S. Cl.
CPC ...... *B29C 43/36* (2013.01); *B29C 2043/3613* (2013.01); *B29L 2031/00* (2013.01); *B29L 2031/7146* (2013.01)

(58) Field of Classification Search
CPC .......... B29C 2043/3613; B29C 33/301; B29C 33/38; B29C 33/42; B29C 37/005; B29C 43/36; B29C 2043/3205; B29C 2043/3602; B29C 2043/3615; B29C 2043/3639; B29C 43/04; B29C 43/361; B29L 2031/3468; B29L 2031/7146; B29L 2031/00
USPC .......................................... 264/319; 425/168
See application file for complete search history.

(56) References Cited

FOREIGN PATENT DOCUMENTS

| | | | |
|---|---|---|---|
| JP | H11019731 A | 1/1999 | |
| JP | 2014083573 A | 5/2014 | |
| KR | 950009145 B1 * | 8/1995 | ........... B21D 45/006 |
| KR | 20060011428 A | 2/2006 | |
| KR | 100586896 B1 | 6/2006 | |
| KR | 20080081845 A | 9/2008 | |
| KR | 20140019933 A | 2/2014 | |
| KR | 101443832 B1 | 9/2014 | |
| KR | 101453559 B1 | 10/2014 | |
| KR | 20140129565 A | 11/2014 | |
| KR | 101904094 B1 | 10/2018 | |
| KR | 20190136551 A | 12/2019 | |
| KR | 20200061034 A | 6/2020 | |
| KR | 102131739 B1 | 7/2020 | |
| KR | 102145494 B1 | 8/2020 | |
| KR | 102150010 B1 | 8/2020 | |
| KR | 102176631 B1 | 11/2020 | |
| KR | 102201640 B1 | 1/2021 | |
| KR | 2354280 B1 * | 1/2022 | ............... B26D 7/02 |
| WO | 2015-045797 A1 | 4/2015 | |
| WO | WO-2016006403 A1 * | 1/2016 | ............. B29C 53/04 |

OTHER PUBLICATIONS

Machine English translation of Futamura Shoji (KR-950009145-B1) (Year: 1995).*
Machine English translation of Kobayashi Hironobu (WO-2016006403-A1) (Year: 2016).*
Machine English translation of Jung (KR-2354280-B1) (Year: 2022).*
International Search Report for PCT/KR2021/016331 mailed Feb. 15, 2022. 3 pgs.
Extended European Search Report for Application No. 21892313.4 dated Oct. 24, 2023. 10 pgs.
Search Report dated Mar. 25, 2025 from the Office Action for Chinese Application No. 202180034461.9 issued Mar. 28, 2025, pp. 1-2.

* cited by examiner

APPARATUS AND METHOD FOR MOLDING POUCH

CROSS-REFERENCE TO RELATED APPLICATIONS

The present application is a national phase entry under 35 U.S.C. § 371 of the International Application No. PCT/KR2021/016331 filed on Nov. 10, 2021, which claims priority from Korean Patent Application Nos. 10-2020-0149608, filed on Nov. 10, 2020, and 10-2021-0149016, filed on Nov. 2, 2021, all of which are incorporated herein by reference in their entireties.

FIELD OF THE INVENTION

The present invention relates to an apparatus and method for molding a pouch, which are capable of molding a pouch for a secondary battery.

BACKGROUND OF THE INVENTION

In general, secondary batteries are chargeable and dischargeable unlike primary batteries that are not chargeable and are widely used in electronic devices such as mobile phones, notebook computers, camcorders, and the like, electric vehicles, or the like.

Such a secondary battery comprises an electrode assembly comprising an electrode tab, an electrode lead coupled to the electrode tab, and a pouch accommodating the electrode assembly in a state in which a front end of the electrode lead is withdrawn to the outside. In addition, the pouch comprises an accommodation part accommodating the electrode assembly and a sealing part sealing the accommodation part while being formed along an edge surface of the accommodation part.

The apparatus for molding the pouch comprises a die on which a pouch film is disposed, a stripper fixing the pouch film disposed on the die, and a punch molding an electrode assembly accommodation part in the pouch film disposed on the die.

However, the stripper comprised in the apparatus for molding the pouch according to the related art has a limitation in stably pressing and fixing the pouch film, which has a different size and shape according to a change in plan or design. Thus, when the pouch film is molded, there is a problem in that cracks and wrinkles occur on a local portion, i.e., an edge portion of the accommodation part.

BRIEF SUMMARY OF THE INVENTION

An object of the present invention for solving the above problems is to provide an apparatus and method for molding a pouch, which is capable of implementing a variable stripper that is capable of adjusting a position of pressing a pouch to stably press and fix a local portion and to stably press and fix a pouch film, which is varied in size and shape according to a change in plan or design, thereby preventing cracks or wrinkles from occurring when the pouch is molded.

An apparatus for molding a pouch according to the present invention for achieving the above object may comprise: a die assembly provided with a die on which a pouch film is disposed; a stripper assembly configured to press and fix both sides of the pouch film disposed on the die; and a punch assembly provided with a punch configured to mold an electrode assembly accommodation part in the pouch film disposed on the die, wherein the stripper assembly may comprise: a stripper disposed at a lower portion of the punch assembly and configured to press and fix the pouch film disposed on the die; a stripper driving piece provided at an upper portion of the punch assembly to provide force so that the stripper presses the pouch film; and a connection part configured to connect the stripper driving piece to the stripper so as to transmit the force, wherein the connection part may comprise: two or more connection rods coupled to the stripper; a connection bar coupled to the stripper driving piece; and a connection piece configured to connect at least one or more connection rods of the two or more connection rods to the connection bar so as to transmit the force.

The connection piece may be disposed between each of the connection rods and the connection bar so that the connection rod and the connection bar are connected to each other to transmit the force.

In the connection part, the connection piece may be disposed between one or more connection rods of the two or more connection rods and the connection bar, and the connection piece between the remaining connection rod and the connection bar may be removed to adjust a position of the force transmitted to the stripper through the stripper driving piece.

The two or more connection rods may be coupled to the stripper in a state of being disposed along an edge of the stripper.

Two or more insertion grooves, into which the two or more connection rods are inserted, respectively, may be formed in the connection bar, an empty space may be formed between a bottom surface of each of the insertion grooves and each of the connection rods so that the force transmitted to the connection bar is not transmitted to the connection rod, and the connection piece may be disposed in the empty space so that the connection rod and the connection bar are connected to each other to transmit the force.

At least five or more connection rods may be provided, five or more insertion grooves may be formed in the connection bar so that the five or more connection rods are inserted, and the connection piece may be provided to be disposed between at least contiguous three or more connection rods and the insertion grooves of the connection bar.

The insertion groove, the connection rod, and the connection piece may be disposed on the same vertical line and have circular shapes when viewed from a top surface of the connection bar.

A through-hole may be formed in the connection piece. The connection piece may be provided to be fitted into the connection rod.

The connection piece may be made of a material having the same strength as the connection rod or the connection bar.

The connection piece may have a structure in which a plurality of connection blocks are stacked in multiple stages, and the connection piece may be adjusted in thickness according to the number of stacked connection blocks.

A method for molding a pouch according to the present invention may comprises: a process (a) of disposing a pouch film on a die of a die assembly; a process (b) of pressing and fixing the pouch film disposed on the die through a stripper assembly comprising a stripper, a stripper driving piece, and a connection part, which connects the stripper to the stripper driving piece to transmit force therebetween; and a process (c) of molding the pouch film disposed on the die through a punch of a punch assembly to manufacture the pouch film, in which an electrode assembly accommodation part is formed, wherein, in the process (b), the connection part may comprise two or more connection rods, a connection bar, and a connection piece, wherein, in the connection part, two or more connection rods may be coupled to the stripper, the connection bar may be coupled to the stripper driving piece, and at least one or more connection rods of the two or more connection rods and the connection bar may be connected to each other by the connection piece so that the stripper and the stripper driving piece are connected to each other to transmit force therebetween.

In the process (b), the connection piece may be disposed between each of the connection rods and the connection bar so that the connection rod and the connection bar are connected to each other to transmit the force.

In the process (b), in the connection part, the connection piece may be disposed between one or more connection rods of the two or more connection rods and the connection bar, and the connection piece between the remaining connection rod and the connection bar may be removed to adjust a position of the force transmitted to the stripper through the stripper driving piece.

In the process (b), at least five or more connection rods may be provided, five or more insertion grooves may be formed in the connection bar so that the five or more connection rods are inserted, and the connection piece may be disposed between at least contiguous three or more connection rods and the insertion grooves of the connection bar to adjust a position of the force transmitted to the stripper.

The apparatus for molding the pouch of the present invention may comprise: the die assembly, the stripper assembly; and the punch assembly. The stripper assembly may comprise: the stripper; the stripper driving piece; and the connection part. The connection part may comprise: the two or more connection rods coupled to the stripper; the connection bar coupled to the stripper driving piece; and the connection piece configured to connect one or more connection rods of the two or more connection rods to the connection bar to transmit the force. Due to this feature, the position of the force transmitted to the stripper may be adjusted through the stripper driving piece, and thus, the pouch film having the various shapes and sizes may be stably pressed and fixed to prevent the cracks and wrinkles from occurring when the pouch is molded.

Figure 1:
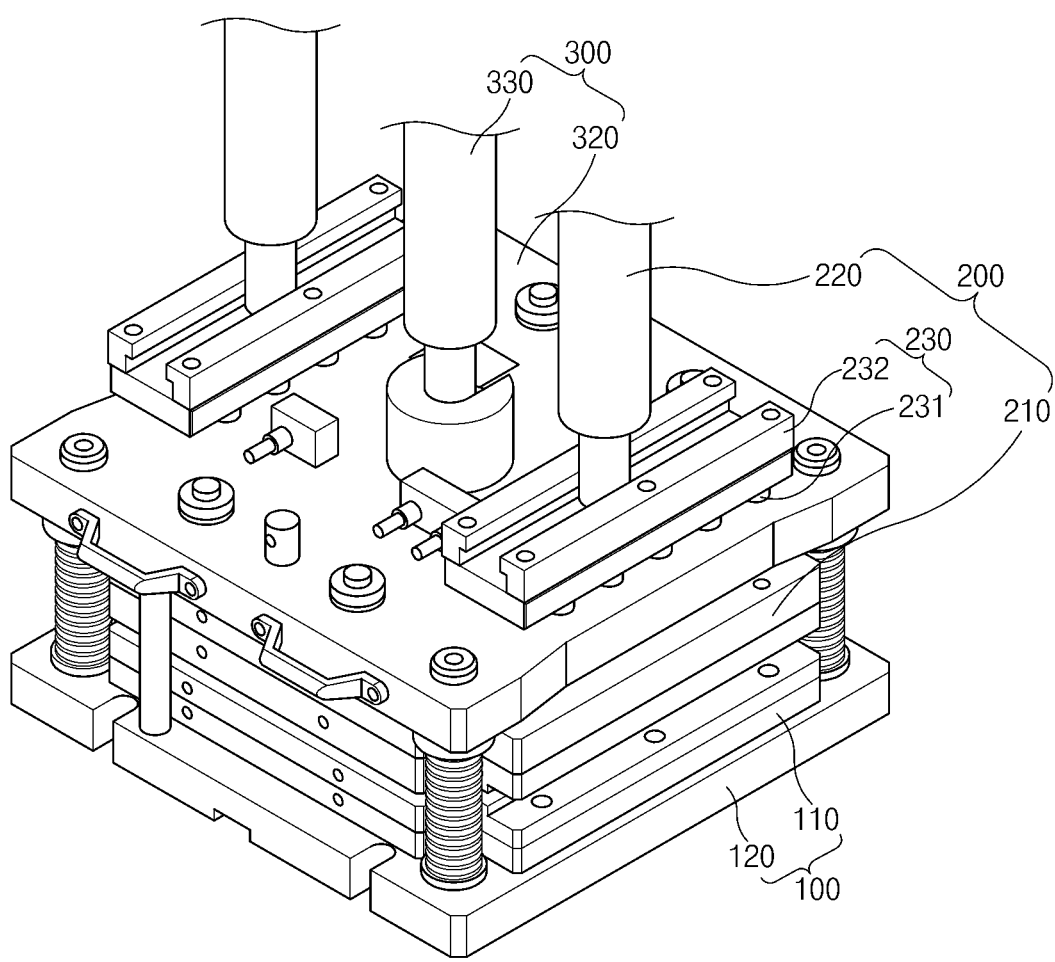
FIG. 1 is an assembled perspective view illustrating an apparatus for molding a pouch according to a first embodiment of the present invention.
Figure 2:
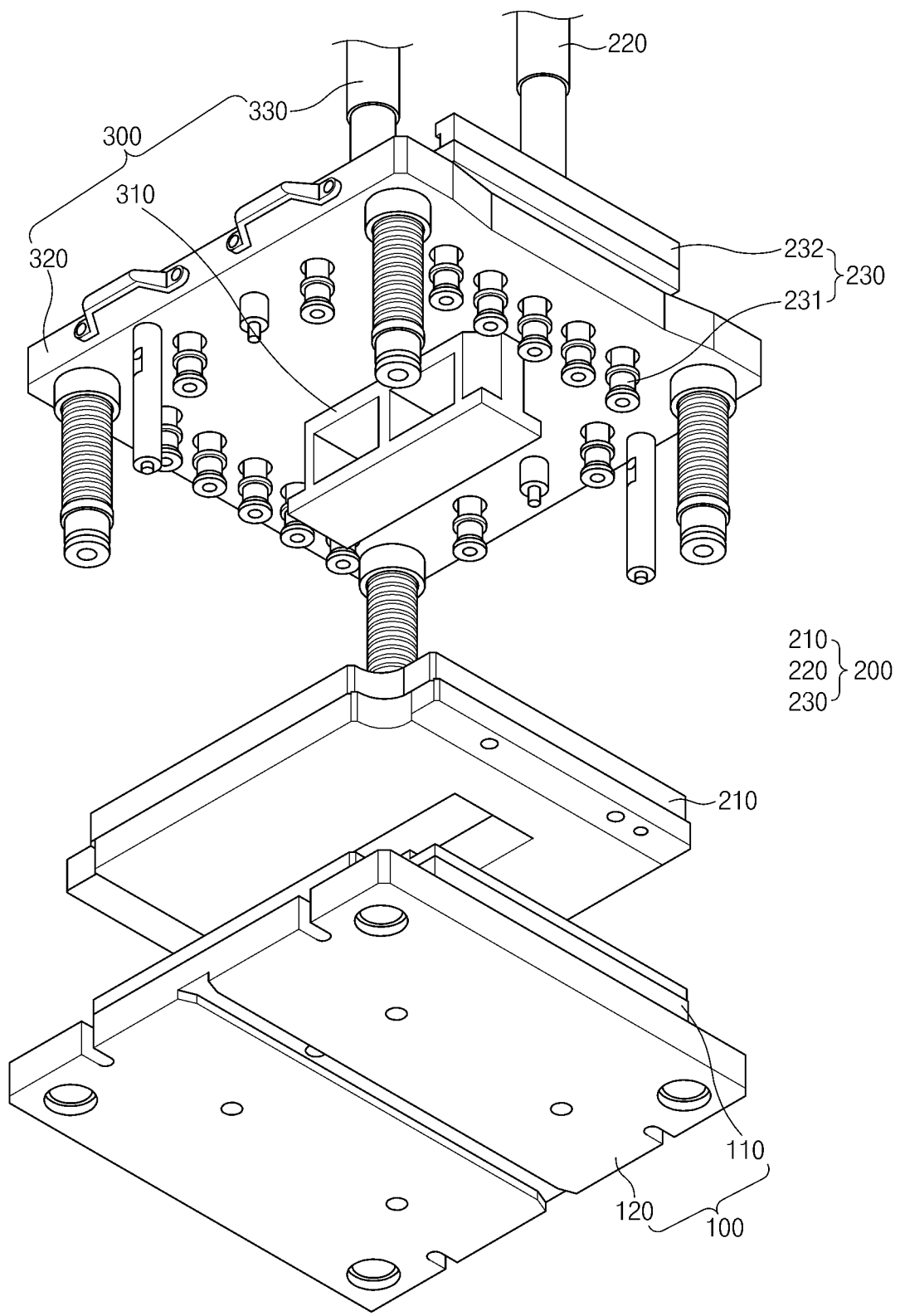
FIG. 2 is an exploded perspective view illustrating the apparatus for molding the pouch according to the first embodiment of the present invention.
Figure 3:
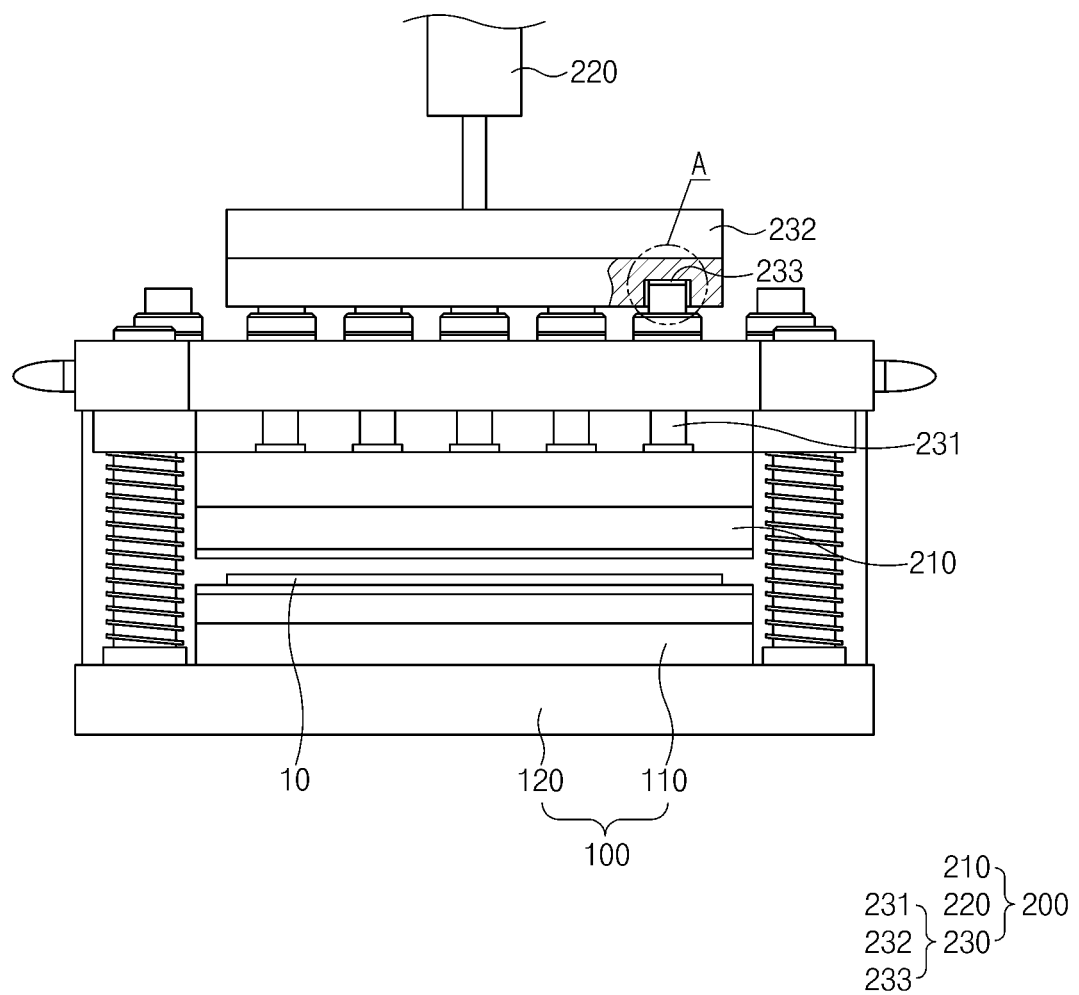
FIG. 3 is a side view illustrating the apparatus for molding the pouch according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Pouch]

Figure 4:
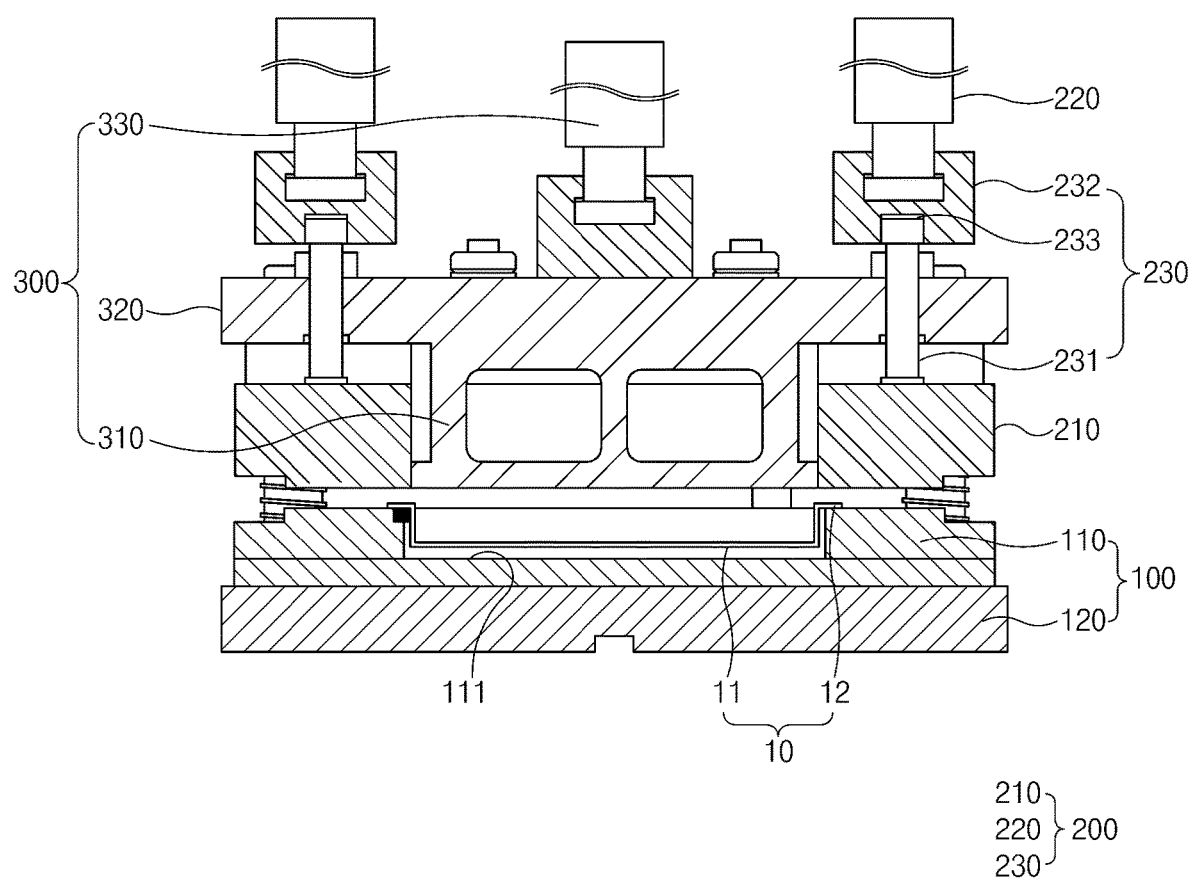
FIG. 4 is a cross-sectional view illustrating the apparatus for molding the pouch according to the first embodiment of the present invention.
Figure 5:
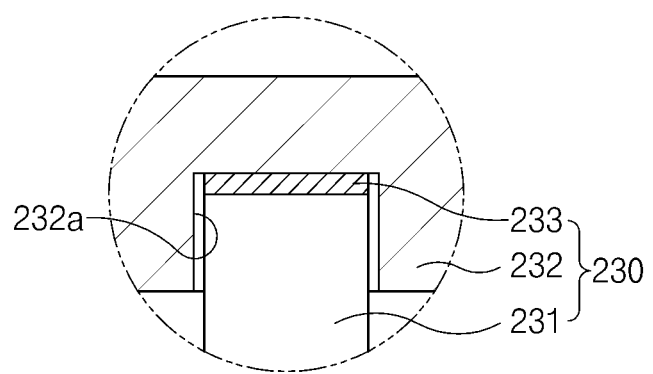
FIG. 5 is an enlarged view of a portion 'A' illustrated in FIG. 3.

Referring to FIG. 4, a pouch is configured to accommodate an electrode assembly. That is, the pouch comprises an electrode assembly accommodation part 11 accommodating the electrode assembly and a sealing part 12 sealing the electrode assembly accommodation part 11.

In a method for manufacturing a pouch having such a structure, the electrode assembly accommodation part is molded at one side of the pouch film, and the other surface of the pouch film is bent to overlap the electrode assembly accommodation part, and then, an edge of the pouch film is sealed. Then, the finished product pouch may be manufactured.

Here, the electrode assembly accommodation part formed in the pouch film is molded by the apparatus for molding the pouch according to the present invention.

[Apparatus for Molding Pouch According to First Embodiment of the Present Invention]

As shown in FIGS. 1 to 7, an apparatus for molding a pouch according to a first embodiment of the present invention comprises a die assembly 100 provided with a die on which a pouch film 10 is disposed, a stripper assembly 200 pressing and fixing both sides of the pouch film disposed on the die, and a punch assembly 300 provided with a punch for molding an electrode assembly accommodation part in the pouch film 10 disposed on the die.

Die Assembly

The die assembly 100 is configured to dispose the pouch film 10 and comprises a die 110, on which the pouch film 10 is disposed, and a die holder 120 to which the die 110 is fixed.

Here, the die 110 has a surface area less than that of the die holder 120. In addition, a molding part 111 molding the electrode assembly accommodation part in the pouch film 10 is formed in a top surface of the die 110. The molding part may be provided as a molding groove.

That is, the die 110 comprises an upper die and a lower die, which are stacked vertically, a molding hole penetrated vertically, and the lower die is disposed under the upper die to close a lower portion of the molding hole. Thus, as the lower portion of the molding hole is closed by the lower die, the molding groove that is the molding part is formed.

Stripper Assembly

The stripper assembly 200 is configured to immovably fix the pouch film disposed on the die member. That is, the stripper assembly 200 comprises a stripper 210 provided to be movable vertically on an upper portion of the die assembly 100 to press (i.e., push) and fix both ends of the pouch film 10 disposed on the die 110, a stripper driving piece 220 allowing the stripper 210 to ascend or descend so as to provide force so as to press the pouch film 10, and a connection part 230 connecting the stripper 210 to the stripper driving piece 220 to transmit force.

The stripper 210 has a size corresponding (equal) to that of the top surface of the die 110. A through-hole vertically passing through the stripper 121 and having the same size as the forming part 111 is formed in a top surface of the stripper 121. The stripper driving piece 220 may be a cylinder.

Punch Assembly

The punch assembly 300 is configured to mold the electrode assembly accommodation part in the pouch film disposed on the die. That is, the punch assembly 300 comprises a punch provided to be movable vertically on the upper portion of the die assembly 100 to mold the electrode assembly accommodation part 11 in the pouch film 10 while being inserted into the molding part 111, a punch plate 320 to which the punch 310 is fixed, and a punch driving piece 330 that fixes the punch plate 320 or allows the punch plate 320 to move vertically. The punch driving piece 330 may be a cylinder.

In the apparatus for molding the pouch, which has such a configuration, according to the first embodiment of the present invention, the pouch film 10 is disposed on the die 110 of the die assembly 100, and then, the die assembly 100 ascends toward the punch assembly 300. Then, while the stripper 210 of the stripper assembly 200 is pressed on both sides of the pouch film 10 disposed on the die 110, the pouch film 10 may be fixed. Here, when force of the stripper 210, which presses the pouch film 10, becomes a set pressure, the stripper assembly 200 ascends to allow the stripper 210 to be interlocked with the die 110 through the stripper driving piece 220 and the connection part 230, and thus, the pressing force of the stripper 210 is constantly maintained.

Particularly, referring to FIG. 4, when the die 110 ascends, the punch 310 is supported on the pouch film 10. Here, since the punch assembly 300 is fixed, the punch 310 is inserted into the molding part 111 of the die 110 in a state of pressing the pouch film 10, and thus, the electrode assembly accommodation part 11 may be formed while forming the pouch film 10. In addition, a sealing part 12 is formed on an edge of the electrode assembly accommodation part 11.

Thus, the apparatus for molding the pouch according to the first embodiment of the present invention may comprise the die assembly 100, the stripper assembly 200, and the punch assembly 300 to stably mold the electrode assembly accommodation part in the pouch film.

When a change in plan or design occurs in the secondary battery, the pouch may be changed in size and shape. Here, in the apparatus for molding the pouch according to the first embodiment of the present invention, the position of the force transmitted to the stripper may be varied according to the pouch in which the change in plan or design occurs, and thus, fixing force of the pouch may increase.

That is, the apparatus for molding the pouch according to the first embodiment of the present invention has a structure, in which the position of the force transmitted to the stripper 210 is varied according to the size and shape of the pouch film. Thus, the pressing force of the stripper 210 may be concentrated to the pouch film 10 disposed on the die 110, and thus, the fixing force of the pouch film 10 may increase.

For example, the apparatus for molding the pouch according to the first embodiment of the present invention comprises the connection part 230 capable of varying (or adjusting) the position, to which the force is transmitted to the stripper 210, in the stripper driving piece 220 of the stripper assembly 200.

The connection part 230 is configured to adjust a connection position of the force transmitted from the stripper driving piece 220 and the stripper 210 and comprises two or more connection rods 231 coupled to the stripper 210, a connection bar 232 coupled to the stripper driving piece 220, and a connection piece 233 connecting at least one or more connection rods 231 of the two or more connection rods 231 to the connection bar 232 to transmit the force.

Here, the connection piece 233 may be disposed between the connection rod 231 and the connection bar 232 to connect the connection rod to the connection bar so that the force is transmitted.

The connection rod 231 is formed in two or more, and a lower end of the connection rod 231 is coupled to the stripper 210 in a state of being disposed along an edge (left and right direction when viewed in FIG. 3) of the stripper 210. Here, two or more connection rods 231 may be arranged at regular intervals.

The connection bar 232 is formed to extend in a direction in which the connection bar is disposed.

The connection piece 233 connects the entire two or more connection rods 231 to the connection bar 232 to transmit the force or connects one or more connection rod 231 of the two or more connection rods 231 to the connection bar 232 to transmit the force.

That is, when the connection part 230 is disposed between the connection rod 231 and the connection bar 232, the connection bar 232, the connection piece 233, and the connection rod 231 are sequentially disposed to be in close contact with each other so that the force of the stripper driving piece 220 is transmitted to the stripper 210. In addition, if the connection piece 233 is not disposed between the connection rod 231 and the connection bar 232, the connection bar 232 and the connection bar 231 are spaced apart from each other, and thus, the force of the stripper driving piece 220 is not transmitted to the stripper 210.

Particularly, in the connection part 230, the connection piece 233 may be disposed between one or more connection rods 231 of the two or more connection rods 231 and the connection bar 232, and the connection piece 233 between the remaining connection rod 231 and the connection bar 232 may be removed. Thus, it is possible to adjust the position of the force transmitted to the stripper 210 through the stripper driving piece 220.

In summary, when the connection piece 233 is disposed at only a portion between the connection rod 231 and the connection bar 232, at which the pouch film is disposed, the force of the stripper driving piece 220 may be concentrically transmitted to only a portion of the stripper 210 at which the pouch film is disposed, and thus, the pouch film may be more concentrically pressed and fixed rather than the pouch film 10.

Thus, the apparatus for molding the pouch according to the first embodiment of the present invention may comprise the connection part 230 provided with the two or more connection rods 231, the connection bar 232, and the connection piece 233 to vary (or adjust) the position of the force transmitted to the stripper 210 through the stripper driving piece 220 according to the size and shape of the pouch film, thereby improving the fixing force of the pouch film. In addition, it is possible to prevent the force of the stripper driving piece from being transmitted to the portion of the stripper without the pouch film.

In the apparatus for molding the pouch according to the first embodiment of the present invention, the connection bar 232 has two or more insertion grooves 232a formed in a longitudinal direction, and the two or more connection rods 231 are inserted into the two or more insertion grooves 232a, respectively. Here, an empty space may be formed between a bottom surface of each of the insertion grooves 232a and the connection rod 231 so that the force transmitted to the connection bar 232 is not transmitted to the connection rod 231, and the connection piece 233 may be disposed in the empty space so that the connection rod 231 and the connection bar 232 are connected to each other so as to transmit the force therebetween. Particularly, as the connection rod 231 and the connection piece 233 are inserted into the insertion grooves 232a, connectivity therebetween may be improved.

In order to effectively vary the position of the force transmitted to the stripper through the stripper driving piece in the apparatus for molding the pouch according to the first embodiment of the present invention, at least five or more connection rods 231 are coupled to the stripper 210 at regular intervals. In addition, five or more insertion grooves 232a are formed in the connection bar 232 so that five or more connection rods 231 are inserted, and the connection piece 233 is disposed between at least contiguous two or more, preferably three or more connection rods 231 and the grooves 232a of the connection bar 232.

Figure 6:
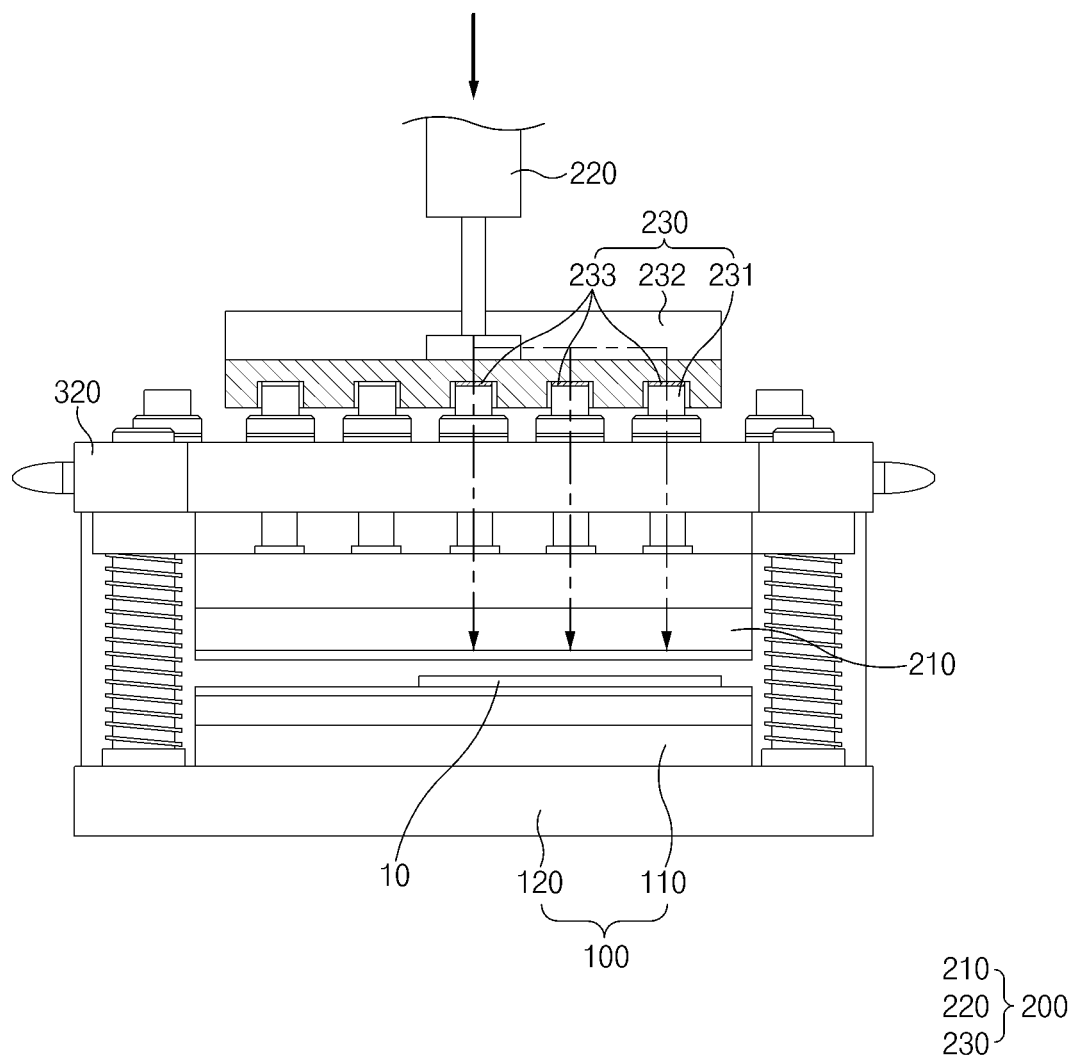
FIG. 6 is a side view illustrating a first example of the apparatus for molding the pouch according to the first embodiment of the present invention.

As a first example, as illustrated in FIG. 6, the force of the stripper driving piece 220 may be varied to be transmitted to a right side of the stripper 210 through the three connection rods 231.

Figure 7:
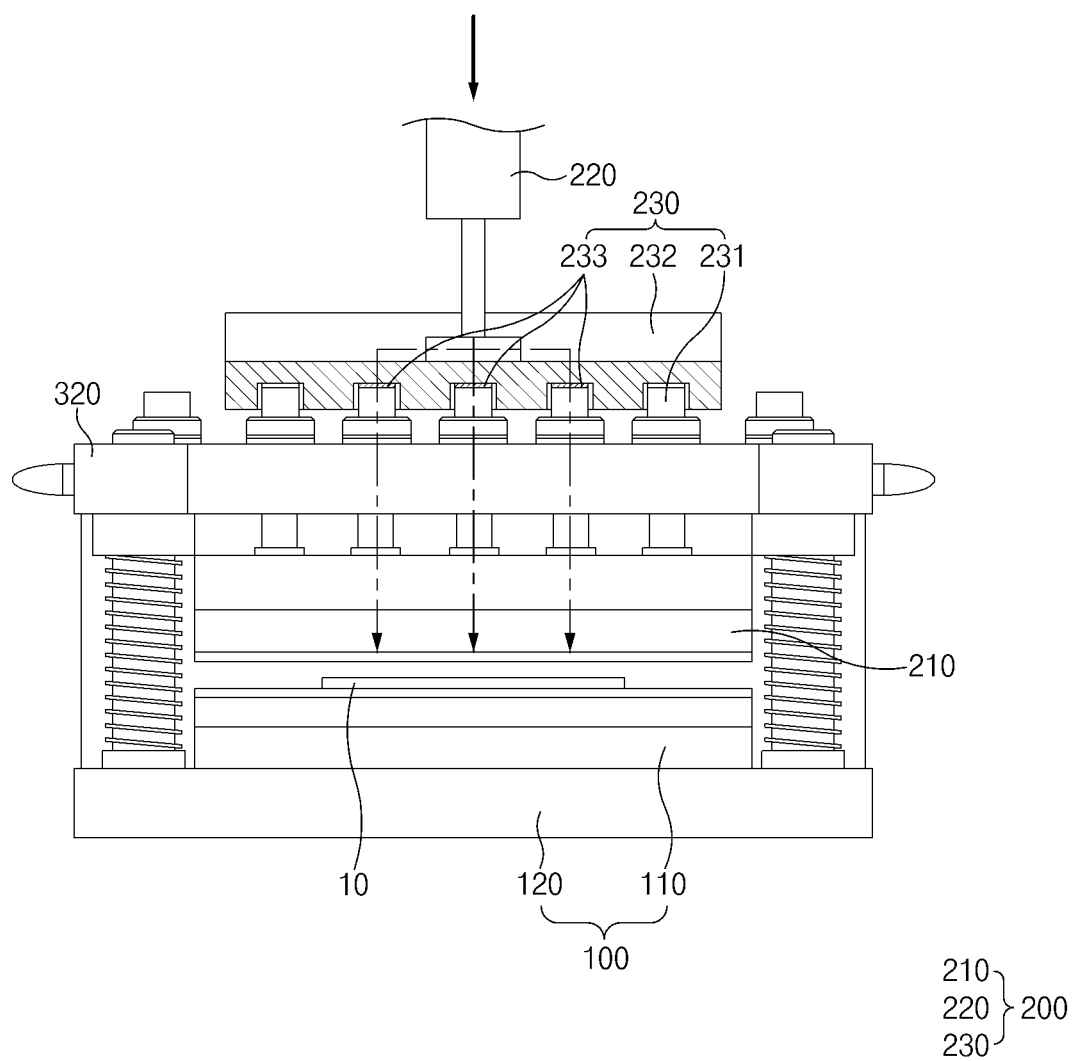
FIG. 7 is a side view illustrating a second example of the apparatus for molding the pouch according to the first embodiment of the present invention.

As a second example, as illustrated in FIG. 7, the force of the stripper driving piece 220 may be varied to be transmitted to a center of the stripper 210 through the three connection rods 231, which are disposed at the center.

Thus, in the apparatus for molding the pouch according to the first embodiment of the present invention, the position of the force applied to the stripper may be varied according to the position of the pouch film, and as a result, the pouch film may be stably fixed.

In the apparatus for molding the pouch according to the first embodiment of the present invention, the insertion groove 232a, the connection rod 231, and the connection piece 233 may be formed on the same vertical line and have circular shapes when viewed from the top surface of the connection bar 232. Thus, even when the connection piece 233 or the connection bar 232 rotates in a left and right direction, an occurrence of torsion or frictional force may be minimized, and a load generated in the insertion groove 232a, the connection rod 231, and the connection piece 233 may be effectively distributed.

In the apparatus for molding the pouch according to the first embodiment of the present invention, the connection piece 233 may be made of a material having the same strength as the connection rod 231 or the connection bar 232, and thus, it is possible to prevent problems such as a change in thickness while the connection piece 233 is compressed between the connection rod 231 and the connection bar 232.

The connection piece 233 may be made of alloy steel or steel that is the same material as the connection rod 231 or the connection bar 232.

Therefore, in the apparatus for molding the pouch according to the first embodiment of the present invention, the position of the force applied to the stripper may be varied according to pouch films having various sizes, and as a result, the fixing force of the pouch film may increase to prevent wrinkles or cracks from occurring on the pouch.

Hereinafter, a method for molding a pouch according to the first embodiment of the present invention will be described.

[Method for Molding Pouch According to First Embodiment of the Present Invention]

Figure 8:
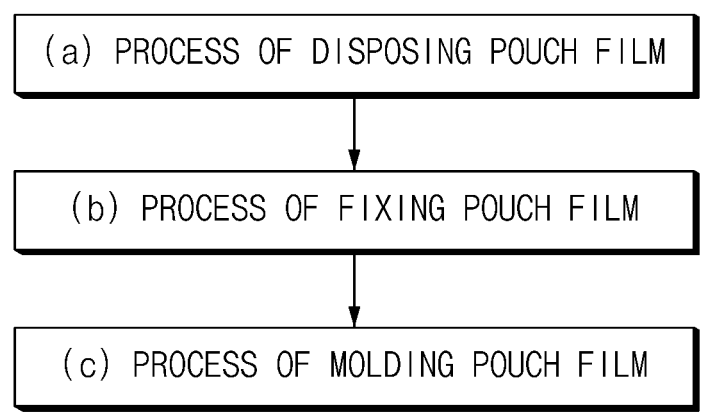
FIG. 8 is a flowchart illustrating a method for molding a pouch according to the first embodiment of the present invention.

As illustrated in FIG. 8, a method for molding a pouch according to the first embodiment of the present invention comprises a process (a) of disposing a pouch film 10 on a die 110 of a die assembly 100, a process (b) of pressing and fixing both sides of the pouch film disposed on the die 110 through a stripper assembly 200 comprising a stripper 210, a stripper driving piece 220, and a connection part 230, which connects the stripper 210 to the stripper driving piece 220 to transmit force therebetween, and a process (c) of molding the pouch film 10 disposed on the die 110 through a punch 310 of a punch assembly 300 to manufacture the pouch film 10, in which an electrode assembly accommodation part is formed.

Here, the stripper assembly 200 has a structure, in which a connection position at which force of the stripper driving piece 220 and the stripper 210 is transmitted through the connection part 230 so that the force is concentrated on the pouch film 10.

In the process (a), the pouch film 10 is disposed on the die 110 of the die assembly 100.

In the process (b), both the sides of the pouch film 10 disposed on the die 110 are pressed to be fixed through the stripper assembly 200, and the force is adjusted to be transmitted to only the stripper 210 disposed within a range of the pouch film 10 disposed on the die 110 through the connection part 230.

Here, the connection part 230 comprises two or more connection rods 231 coupled to the stripper 210, one connection bar 232 coupled to the stripper driving piece 220, and a connection piece 233 connecting one or more connection rods 231 of the two or more connection rods 231 to the connection bar 232 to transmit the force.

In more detail, the connection piece 233 is disposed only between the one or more connection rods 231 (i.e., the connection rod disposed within a range of the pouch film 10) of the two or more connection rods 231 and the connection bar 232 to connect the stripper driving piece 220 to the stripper 210 so that the force of the stripper driving piece 220 is transmitted to the stripper 210. Here, the connection rod 231 is inserted into the insertion groove 232a of the connection bar 232 in a state in which the connection piece 233 is disposed on a top surface of the connection rod 231 to increase in connectivity. Also, the connection piece 233 between the remaining connection rod 231 (i.e., the connection rod disposed outside the pouch film) and the connection bar 232 is removed to prevent the force of the stripper driving piece 220 from being transmitted to a portion of the stripper 210 disposed outside the pouch film. Thus, the position of the force transmitted to the stripper through the stripper driving piece 220 may be adjusted, and the force of the stripper driving piece 220 may be concentrated to the stripper 210, on which the pouch film is disposed, to increase in fixing force of the pouch film.

For example, referring to FIGS. 6 and 7, in the process (b), at least five or more connection rods 231 are provided, and the connection bar 232 has five or more insertion grooves 232a so that the five or more connection rods 231 are inserted. Also, the connection piece 233 is disposed between at least three or more contiguous connection rods 231 and the insertion grooves 232a of the connection bar 232. Thus, the force of the stripper driving piece 220 may be varied to be transmitted to a left side of the stripper 210 when viewed in FIG. 6 and may be varied to be transmitted to a center when viewed in FIG. 7.

When the adjustment of the connection part is completed as described above, the die assembly 100 ascends in a direction of the punch assembly 300. Then, while the stripper 210 is pressed to the pouch film 10 disposed on the die 110, the pouch film may be fixed. Also, when the pressing force of the stripper 210 becomes a set pressure, the stripper assembly 200 ascends together with the die assembly 100.

In process (c), the pouch film 10 disposed on the die 110 is molded through the punch 320 of the punch assembly 300. Thus, the pouch film in which the electrode assembly accommodation part is formed may be manufactured.

That is, in process (c), when the stripper assembly 200 ascends together with the die assembly 100, the punch 320 is pressed to the pouch film 10. Here, since the punch assembly 300 is fixed, the punch 320 molds the electrode assembly accommodation part in the pouch film 10 while being inserted into the molding part 111 of the die 110 in a state of pressing the pouch film 10.

When the above-described process is completed, the pouch film, in which the electrode assembly accommodation part is formed, may be manufactured.

Hereinafter, in descriptions of another embodiment of the present invention, constituents having the same function as the above-mentioned embodiment have been given the same reference numeral in the drawings, and thus duplicated description will be omitted.

[Apparatus for Molding Pouch According to Second Embodiment of the Present Invention]

Figure 9:
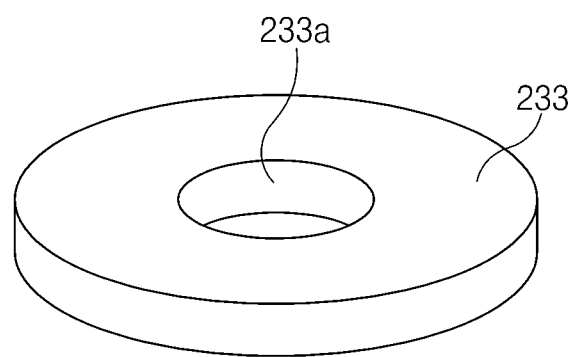
FIG. 9 is a perspective view illustrating an apparatus for molding a pouch according to a second embodiment of the present invention.

As illustrated in FIG. 9, an apparatus for molding a pouch according to a second embodiment of the present invention comprises a circular connection piece 233, and a circular through-hole 233a penetrating vertically is formed in a top surface of the connection piece.

Thus, in the apparatus for molding the pouch according to the second embodiment of the present invention, the through-hole 233a may be formed in the connection piece 233 to store foreign substances generated between the insertion groove 232a of the connection bar 232, the connection piece 233, and the connection rod 231.

[Apparatus for Molding Pouch According to Third Embodiment of the Present Invention]

Figure 10:
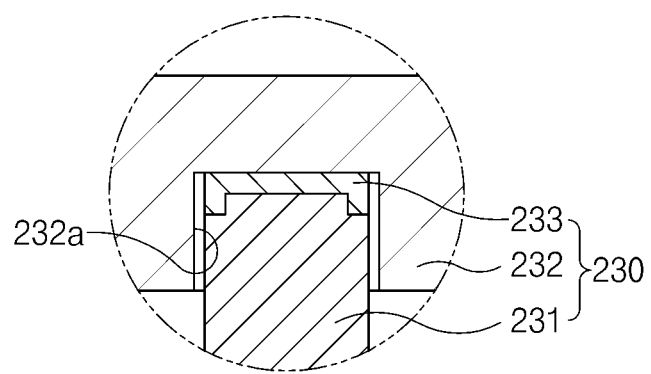
FIG. 10 is a cross-sectional view illustrating an apparatus for molding a pouch according to a third embodiment of the present invention.

As illustrated in FIG. 10, an apparatus for molding a pouch according to a third embodiment of the present invention comprises a connection rod 231 and a connection piece 233. Referring to FIG. 10, the connection piece 233 is coupled to be fitted into an upper portion of the connection rod 231.

That is, the connection piece 233 may be press-fitted or screw-coupled to the upper portion of the connection rod 231.

Thus, the apparatus for molding the pouch according to the third embodiment of the present invention may increase in bonding force between the connection rod 231 and the connection piece 233.

[Apparatus for Molding Pouch According to Fourth Embodiment of the Present Invention]

Figure 11:
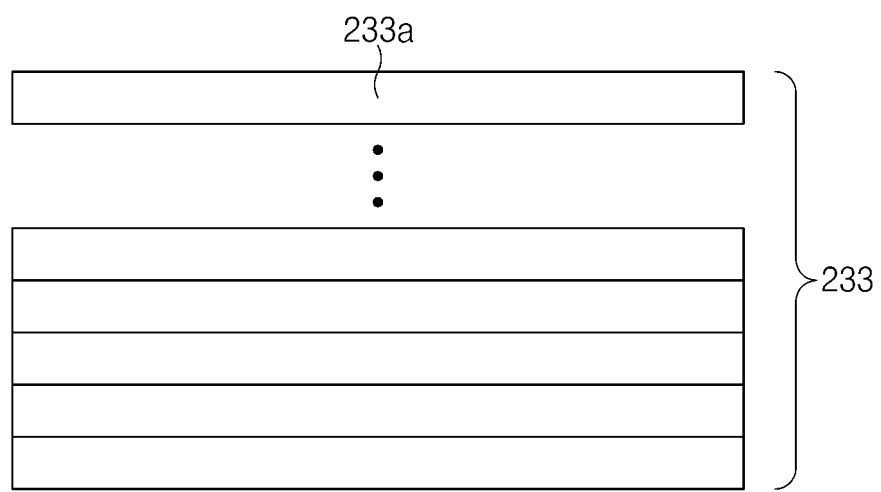
FIG. 11 is a perspective view illustrating an apparatus for molding a pouch according to a fourth embodiment of the present invention.

As illustrated in FIG. 11, an apparatus for molding a pouch according to a fourth embodiment of the present invention comprises a connection piece 233. The connection piece 233 has a structure in which a plurality of connection blocks 233a are stacked in multiple stages. That is, a thickness of the connection piece 233 may be adjusted according to the number of stacked connection blocks 233a.

Therefore, in the apparatus for molding the pouch according to the fourth embodiment of the present invention, the connection piece 233 may be manufactured to match a height of an empty space between a bottom surface of an insertion groove of a connection bar and a top surface of a connection rod.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Pouch film
100: Die assembly
110: Die
111: Molding groove
120: Die holder
200: Stripper assembly
210: Stripper
220: Stripper driving piece
230: Connection part
231: Connection rod
232: Connection bar
232a: Insertion groove
233: Connection piece
300: Punch assembly
310: Punch
320: Punch plate
330: Punch driving piece

The invention claimed is:

1. An apparatus for molding a pouch, the apparatus comprising:
a die assembly comprising a die on which a pouch film is configured to be disposed;
a stripper assembly configured to press and fix first and second sides of the pouch film disposed on the die; and
a punch assembly comprising a punch configured to mold an electrode assembly accommodation part in the pouch film disposed on the die,
wherein the stripper assembly comprises:
a stripper disposed at a lower portion of the punch assembly and configured to press and fix the pouch film disposed on the die;
a stripper driving piece provided at an upper portion of the punch assembly to provide force so that the stripper presses the pouch film; and
a connection part configured to connect the stripper driving piece to the stripper so as to transmit the force,
wherein the connection part comprises:
two or more connection rods coupled to the stripper;
a connection bar coupled to the stripper driving piece; and
a connection piece configured to connect at least one or more connection rods of the two or more connection rods to the connection bar so as to transmit the force,
wherein the connection bar comprises two or more insertion grooves, into which the two or more connection rods are inserted, respectively,
wherein an empty space is formed between a bottom surface of each of the insertion grooves and each of the connection rods so that the force transmitted to the connection bar is not transmitted to the connection rod,
wherein the connection piece is selectively disposed in at least one of the empty spaces so that the corresponding connection rod and the connection bar are connected to each other to transmit the force, and
wherein no connection piece is disposed in at least one of the empty spaces so that the corresponding connection rod and the connection bar are not connected to each other to transmit the force.

2. The apparatus of claim 1, wherein the connection piece is provided to be fitted into corresponding one of the two or more connection rods.

3. The apparatus of claim 1, wherein the connection piece is made of a material having the same strength as a material of the connection rod or the connection bar.

4. The apparatus of claim 1, wherein the connection piece has a structure in which a plurality of connection blocks are stacked in multiple stages, and
the connection piece is adjusted in thickness according to the number of stacked connection blocks.

5. A method for molding a pouch, the method comprising:
disposing a pouch film on a die of a die assembly;
pressing and fixing the pouch film disposed on the die through a stripper assembly comprising a stripper, a stripper driving piece, and a connection part, which connects the stripper to the stripper driving piece to transmit force therebetween; and
molding the pouch film disposed on the die through a punch of a punch assembly to manufacture the pouch film, in which an electrode assembly accommodation part is formed,
wherein, the connection part comprises two or more connection rods, a connection bar, and a connection piece, wherein the connection bar comprises two or more insertion grooves, into which the two or more connection rods are inserted, respectively, wherein an empty space is formed between a bottom surface of each of the insertion grooves and each of the connection rods so that the force transmitted to the connection bar is not transmitted to the connection rod, wherein the connection piece is selectively disposed in at least one of the empty spaces so that the corresponding connection rod and the connection bar are connected to each other to transmit the force, and wherein no connection piece is disposed in at least one of the empty spaces so that the corresponding connection rod and the connection bar are not connected to each other to transmit the force,
wherein, in the connection part, the two or more connection rods are coupled to the stripper, the connection bar is coupled to the stripper driving piece, and at least one or more connection rods of the two or more connection rods and the connection bar are connected to each other by the corresponding connection piece so that the stripper and the stripper driving piece are connected to each other to transmit force therebetween.

6. The apparatus of claim 1, wherein, in the connection part, a first of the connection pieces is disposed between one or more connection rods of the two or more connection rods and the connection bar, and a second of the connection pieces between the remaining connection rod and the connection bar is removed to adjust a position of the force transmitted to the stripper through the stripper driving piece.

7. The apparatus of claim 1, wherein the two or more connection rods are coupled to the stripper so as to be disposed along an edge of the stripper.

8. The method of claim 5, wherein, the connection piece is disposed between each of the two or more connection rods and the connection bar so that the two or more connection rods and the connection bar are connected to each other to transmit the force.

9. The method of claim 5, wherein, in the connection part, the connection piece is disposed between one or more connection rods of the two or more connection rods and the connection bar, and the connection piece between the remaining of the two or more connection rods and the connection bar is removed to adjust a position of the force transmitted to the stripper through the stripper driving piece.

10. The method of claim 9, wherein, the two or more connection rods comprise at least five or more connection rods,
five or more insertion grooves are provided in the connection bar so that the five or more connection rods are inserted, and
the connection piece is disposed between at least contiguous three or more connection rods of the at least five or more connection rods and the five or more insertion grooves of the connection bar to adjust a position of the force transmitted to the stripper.

11. The apparatus of claim 1, wherein the two or more connection rods comprise at least five or more connection rods,
the two or more insertion grooves comprise five or more insertion grooves formed in the connection bar so that the five or more connection rods are inserted therein, and
the connection piece is provided to be disposed between at least contiguous three or more connection rods and the insertion grooves of the connection bar.

12. The apparatus of claim 1, wherein each of the corresponding insertion groove, connection rod, and connection piece is disposed on a same vertical line and has a circular shape when viewed from a top surface of the connection bar.

13. The apparatus of claim 1, wherein a through-hole is formed in the connection piece.

* * * * *